(No Model.) 4 Sheets—Sheet 1.

F. H. RICHARDS.
WEIGHING MACHINE.

No. 579,444. Patented Mar. 23, 1897.

Witnesses
J. L. Edwards Jr.
Fred. J. Dole.

Inventor
F. H. Richards.

(No Model.) 4 Sheets—Sheet 2.

F. H. RICHARDS.
WEIGHING MACHINE.

No. 579,444. Patented Mar. 23, 1897.

Fig. 3.

Witnesses:
J. L. Edwards Jr.
Fred. J. Dole.

Inventor:
F. H. Richards.

(No Model.)  4 Sheets—Sheet 3.

F. H. RICHARDS.
WEIGHING MACHINE.

No. 579,444.  Patented Mar. 23, 1897.

Fig. 4.

Witnesses
J. L. Edwards Jr.
Fred. J. Dole.

Inventor
F. H. Richards.

(No Model.) 4 Sheets—Sheet 4.

F. H. RICHARDS.
WEIGHING MACHINE.

No. 579,444. Patented Mar. 23, 1897.

Witnesses:
J. L. Edwards Jr.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,444, dated March 23, 1897.

Application filed October 17, 1896. Serial No. 609,199. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and discharging predetermined charges of material, and more particularly to weighing mechanism by means of which slow-running or sluggish materials, granular or otherwise—such as raw sugar, sugar-cane, cotton, tobacco-stems, &c.—may be weighed readily and with precision.

One of the main features of my present invention consists in the provision of a material-conveyer movable with and preferably supported on the weighing mechanism in such a manner that it may receive and weigh predetermined charges of such materials as hereinbefore specified, it being obvious that a conveyer constructed and organized to weigh and discharge these materials in this manner will constitute a material-carrying or load-receiving weighing-conveyer.

In the embodiment of my invention herein illustrated I prefer to deliver the stream of material onto an endless conveyer or apron supported on the beam mechanism of an automatic weighing-machine, this apron being normally held against traveling movement during the period when the load is being made up thereon, while said apron is caused to travel to deliver or discharge the load thereon when the weighing mechanism has come to a true poise and the charge is completed.

It should be understood that the term "conveyer" as employed in this specification is intended to include screw conveyers and traveling surfaces—such as bands, belts, or chains of endless conveyers—which have the common function of moving or transferring material from one point to another.

Another object of my invention is to provide, in connection with a weighing mechanism, a pair of alternately operative and preferably reciprocally-operative conveyers, one of which is operative for supplying a stream or charge of material from a suitable source, while the other constitutes a material-receiving conveyer upon which this charge is delivered, these conveyers being alternately effective and operable successively for advancing the material carried thereby.

In connection with a suitable source of supply or feeder I may also employ a cut-off valve having a plurality of members independently movable longitudinally and preferably resilient, these members of the valve being so organized relatively to the feeder that when any one of such members meets an obstruction—such as a large body or lump in the stream of material—it will yield readily, while the other members of the valve will be carried to the end of their cut-off movement, thus preventing clogging of the valve by large pieces of material or long stalks, which may interfere with the free operation of the individual parts of the valve.

In the drawings accompanying and forming part of this specification, Figs. 5, 6, and 7 are detail views hereinafter referred to.

Similar characters designate like parts in all the figures of the drawings.

The framework for supporting the several operative parts of my improved weighing-machine may be of any desired construction, and in the present instance it comprises a supporting base or bed 3, a pair of side frames 2 and 4 rising therefrom and connected at their upper ends by a cross-beam 5, and brackets 6 at opposite sides of the machine, (only one of which is shown herein,) connected by a beam or rail 7.

The material to be weighed may be supplied to the machine in any suitable manner—as, for instance, from a bin H, supported on the beam 7 substantially intermediate of the side frames 2 and 4. The sides and the rear end of this bin will be formed, preferably, by the usual inclosing walls, while the forward side thereof will be closed in the present instance by a feeder, which may be in the form of an endless conveyer or traveling apron, (designated in a general way by F.) This feeder may be carried at its opposite ends by rolls or drums 49 and 50, the former of which is supported for rotation in brackets 5″, depending from the beam 5, while the latter is journaled in similar brackets 7′, depending from the cross-beam 7. The belt F will preferably have projecting from its face suitable carrying members—such as the parallel strips $f$—for the purpose of receiving and feeding fibrous materials, stems, stalks, &c., it being understood that this conveyer should be disposed at such an angle that the strips $f$ will not carry up an excess of the loose material in the bin H.

Figure 4:
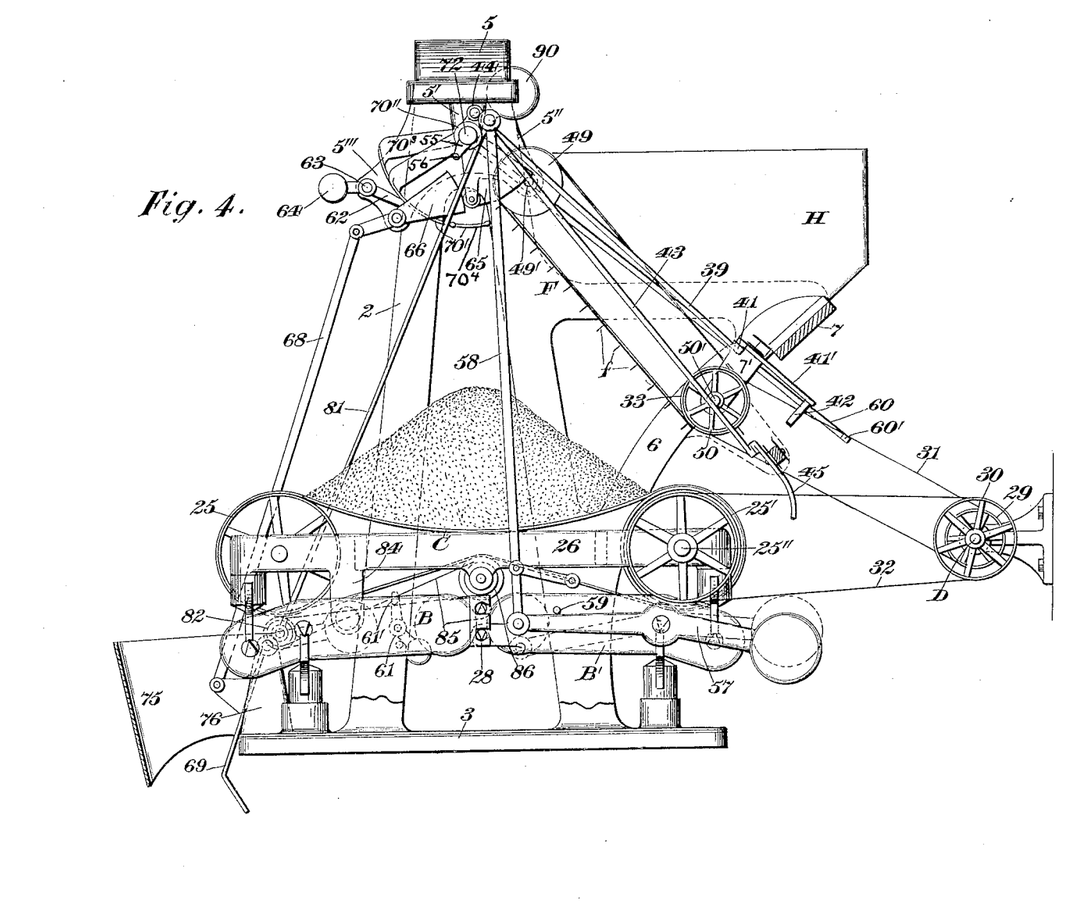
Fig. 4 is a view similar to Fig. 3, illustrating the positions of the parts after the load has been completed and is ready to be discharged from the weighing-conveyer.
Figure 5:
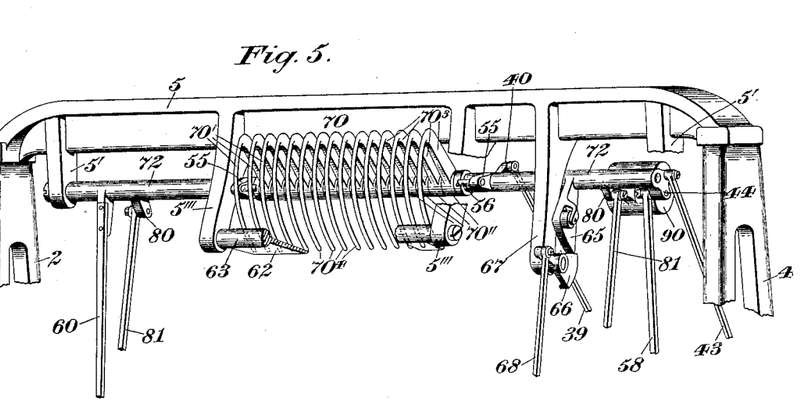
Figure 6:
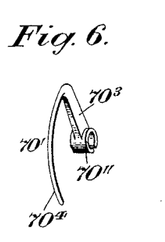

For the purpose of positively cutting off the supply of material from the feeder when a load has been made up I prefer to employ a valve having a plurality of members so constructed that they will yield individually in longitudinal direction when any material obstruction to the movement thereof is encountered. This valve is designated in a general way by 70, and in the present instance is mounted on a shaft 72, pivotally supported by brackets 5′, depending from the beam 5. The several individually-movable members or fingers of the valve proper are designated by 70′, and these are supported in the present instance on the shaft 72 for oscillation therewith in the normal movement of said parts, but said fingers have cheeks or adjacent faces of their collars 70″ in frictional engagement with one another, so that while all of said fingers will usually move simultaneously with the shaft, yet when any considerable resistance—such as is presented by a large body of material—is opposed to the free movement of any one or more of them such finger or fingers will be held against closing movement, as shown in Fig. 4, while the others are oscillated by the shaft 72 for cutting off the supply from the feeder F. These valve-fingers may advantageously be formed in the manner shown in the drawings, with straight substantially rigid shanks $70^3$ where they are connected to the shaft 72 and with yielding or resilient, preferably curved or bowed, tines $70^4$ for intercepting the material delivered from the feeder. (See Fig. 5.)

In the organization shown in my present application the weighing-conveyer constitutes the means for carrying the load which is made up by the weighing mechanism, and this conveyer is designated herein in a general way by C. It is mounted, in the present instance, for traveling movement on rotary carriers or drums 25 and 25′, disposed in parallelism with each other and journaled at opposite ends of a frame 26, pivotally supported by suitable scale-beams.

In the present case I have illustrated two scale-beams, (designated in a general way by B and B′,) which are pivotally mounted on the base 3 of the framework, these scale-beams being preferably counterweighted at their inner ends and connected by means of a guide-link 28, so that they will moved in union, this organization being one well known in the art.

The frame 26, on which the conveyer C is carried, is preferably pivotally supported by the scale-beams B and B′ outside of the pivots of said beams, the bearings employed for mounting the conveyer-frame on the scale-beams and for supporting the scale-beams on the base 3 of the machine being of the usual knife-edge construction, which need not be described in detail.

As it is obvious that the feeder F must deliver the supply of material to the conveyer C while the latter is held against traveling movement and that the weighing-conveyer should discharge its completed load while the feeder F is in turn held against movement, it will be seen that some means should be employed for operating these endless aprons alternately and preferably reciprocally.

In the present instance both the feeding-conveyer and the material carrying or weighing conveyer are driven from the same drive-shaft D, which may be supported in any suitable manner and is preferably carried outside of the weighing-machine. This drive-shaft may have thereon two driving-wheels 29 and 30, the former of which drives by means of a belt 31 the rotary carrier or drum 50 for actuating the feeder F, while the latter band-wheel transmits its movement through a driving-belt 32 to the conveyer C. In both cases, however, I provide means for coupling and uncoupling the belts 31 and 32 from the respective rotary carriers which support and drive the endless conveyers F and C, the belt 31 being shiftable from a loose pulley 33 to a fast pulley 34 for actuating the feeder, while the belt 32 is shiftable from a loose pulley 35 to a fast pulley 36 for actuating the weighing-conveyer. The pulleys 33 and 34 are mounted for rotation on the shaft 50′ of the drum 50, while the pulley 36 is secured to the shaft 25″ of the drum 25′, and the loose pulley 35 is supported by the standard 4 on the framework. This loose pulley is not, however, journaled directly in the upright 4, but is supported for rotation in a vertically-movable carrier 37, working in a slot in the standard 4 and normally held up by means of a spring 38, so that the loose pulley is vertically movable, it being held down by the weight of the driving-belt 32, as shown in Fig. 1, when said belt travels thereon, while this pulley will be carried from its lowermost to its uppermost position by the spring 38 when the belt 32 is shipped from the loose pulley to the fast pulley, as shown in Fig. 2.

The connection of the feeder and the weighing-conveyer to their respective driving devices will be preferably effected by means of automatic coupling and uncoupling devices, the means employed in the present instance being automatic belt-shippers operative for shifting the respective belts 31 and 32 from the loose pulleys 33 and 35 to the corresponding fast pulleys 34 and 36. Both of these shipping means preferably will be operated from the valve-shaft 72, the shipper for the feeder F comprising a connecting-rod 39, pivoted at one of its ends to an arm 40, projecting from said valve-shaft, while at the other end thereof this connecting-rod is pivoted to an angle-lever 41, carried by the bracket 7', (shown at the right in Fig. 1,) from the long arm 41' of which angle-lever project shipping-fingers 42, straddling the upper run of the belt 31. In like manner the shipper for the weighing-conveyer comprises a connecting-rod 43, pivotally connected at its upper end to an arm 44, projecting from the valve-shaft 72, and pivoted at its lower end to an angle-lever 45, the forked lower end of which straddles the upper run of the belt 32.

Figure 1:
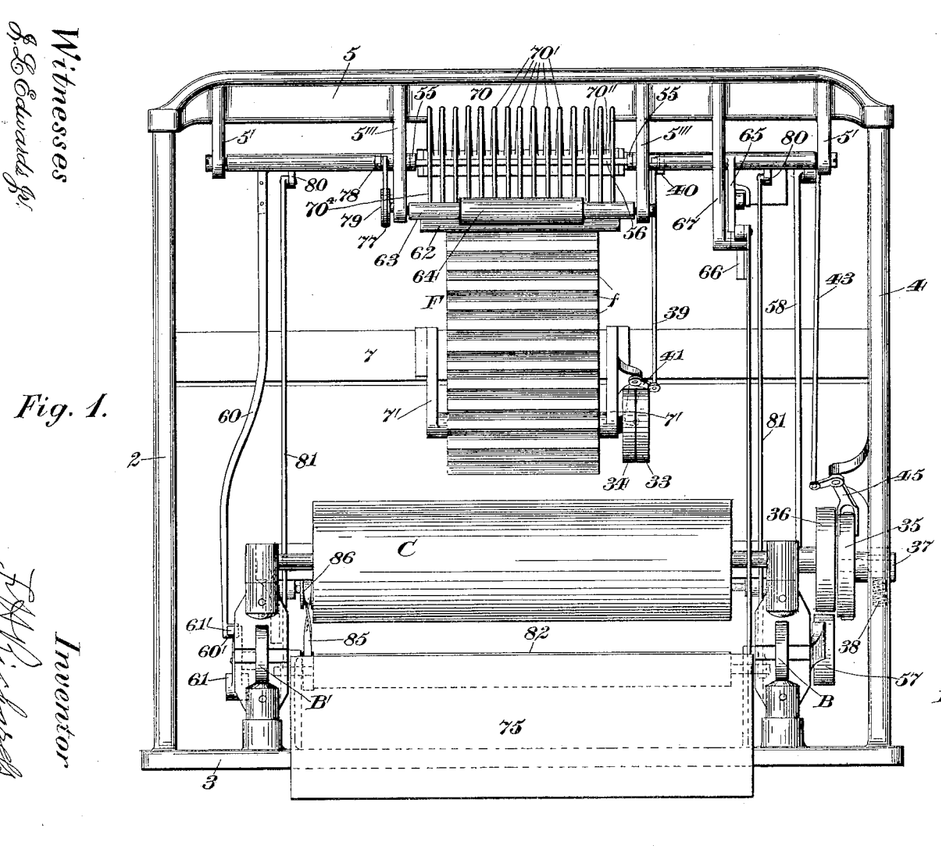
Figure 1 is a front elevation of a weighing-machine embodying my present improvements.
Figure 2:
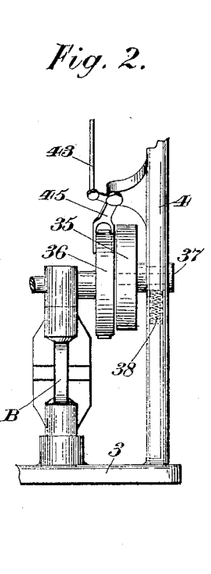
Fig. 2 is a detail front elevation of a portion of the mechanism shown at the lower right-hand side in Fig. 1 and illustrates the belt-shipping means for shifting from its inoperative to its operative position, and vice versa, a driving-belt by means of which the traveling movement of the load-receiving material-conveyer or weighing-conveyer is controlled, the parts being represented in the opposite position from that illustrated in Fig. 1.

It will be noticed by reference more particularly to Fig. 1 that the automatic belt-shippers 42 and 45 are oppositely operative on the oscillation of the shaft 72 in one or the other direction—that is to say, when the valve-shaft oscillates to cut off the stream the shipper 42 will shift the belt 31 from the fast pulley 34 to the loose pulley 33, whereupon the belt-shipper 45 will ship the belt 32 from the loose pulley 35 to the fast pulley 36. Hence it will be seen that these automatic shipping means so control the driving connections from the main shaft D that the feeder and the weighing-conveyer will not only operate alternately, but will be reciprocally operative for advancing the respective bodies of material carried thereon.

The valve-shaft 72 will in the present instance carry a counterweight 90, which forms a valve-opening actuator for operating the valve 70, and for the purpose of positively actuating all of the valve-fingers 70' I have shown a rock-frame secured to the shaft 72 and coöperating with the inner sides of the shanks of the valve members, this rock-frame comprising in the present case a pair of rock-arms 55 and a rock-bar 56, connecting the same.

For the purpose of actuating the valve 70 to close it I may make use of a counterweighted lever 57, having its pivot in alinement with the pivot of the scale-beam B', the inner end of said actuator being in position to coöperate with a thrust-rod 58, pivoted to the rock-arm 44 on the valve-shaft 72. A suitable stop 59 may limit the upward movement of the inner end of this valve-closing actuator, and the valve-closing movement of the latter may be prevented during the making up of the major portion of a load by suitable valve-locking devices, such as a long arm or a drip-lever 60, fixed to the valve-shaft 72, and by a by-pass stop 61, carried on the scale-beam B. The lever 60 and the by-pass have laterally-projecting stops 60' and 61', which are shown most clearly in Fig. 1, the organization of the parts being such that when the inner ends of the scale-beams rise, on the beginning of the descent of the load-receiving conveyer C, the stop 61' will engage the stop 60' and prevent the oscillation of the valve 70 until the inner ends of the beams have risen far enough to permit the release of the lever 60, during which time the valve-closing actuator 57 will be oscillated from the position shown in full lines to that shown in dotted lines in Fig. 4, and upon the release of which lever 60 the actuator 57 will become effective to close the valve, as shown in said figure, and cut off the supply of material issuing from the feeder F.

In the drawings of my present application I have shown a pair of brackets 5''', depending from the beam 5, and these serve in the present case to support a scraper, such as 62, secured to a shaft 63, pivotally supported by the brackets 5''' and counterweighted, as shown at 64, so as to hold the scraper 62 up against the under sides of the resilient fingers of the several separately-movable members and scrape therefrom, on the opening movement of the valve, any material which may project below the tines. The valve-shaft 72 also carries a stop-segment, such as 65, which coöperates with a corresponding segment 66, mounted for oscillation on a bracket 67, depending from the beam 5, the segment 66 being pivotally connected by means of a rod 68 with a regulator 69, preferably counterweighted, which controls the delivery of the weighed load through a suitable delivery-chamber, such as 75. This regulator 69 may be mounted for oscillation on a bracket 76, rising from the base 3 of the machine, it being constructed to hold the segment 66 in the position shown in Fig. 4 so long as material is passing through the chamber 75 and to carry such segment to the position shown in Fig. 3 after the entire load has passed through said chamber.

Figure 3:
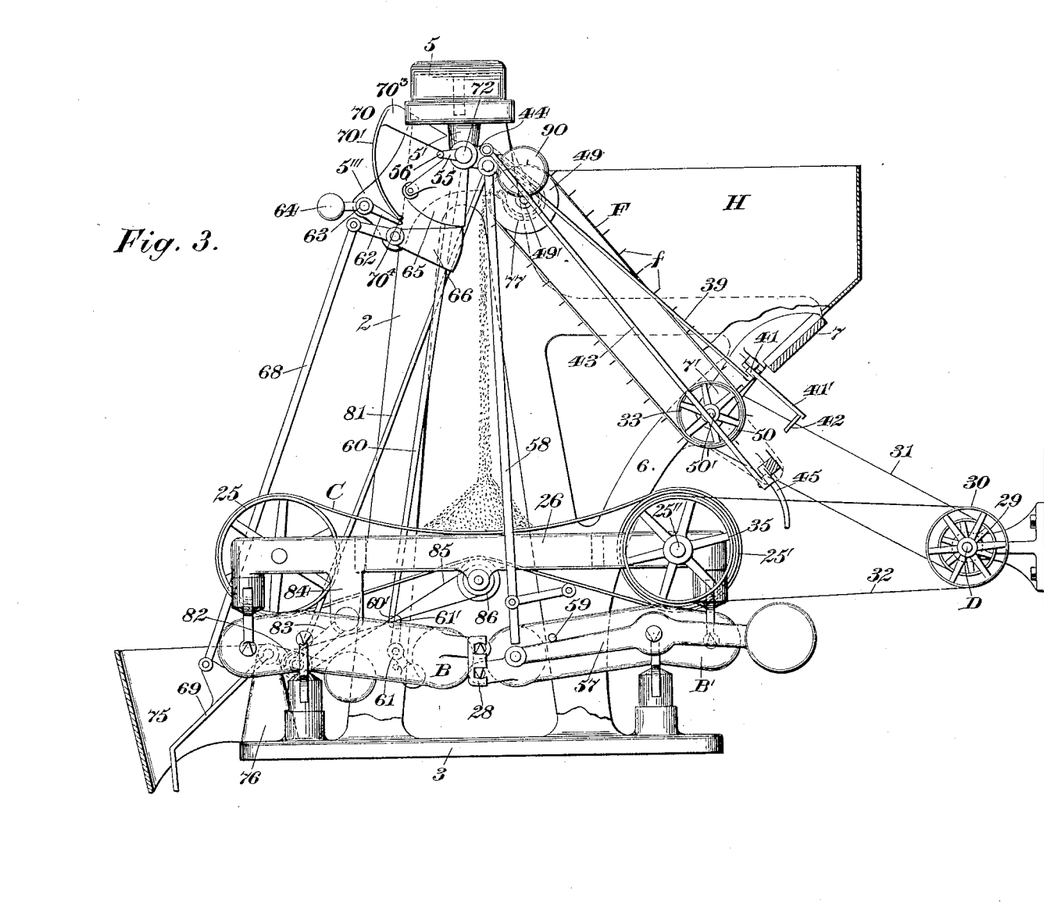
Fig. 3 is a sectional side elevation of the machine, showing the parts in position for supplying material to the weighing-conveyer for making up a load.

It will be obvious also that the segment 65 will prevent the oscillation of the regulator 69 from the position shown in Fig. 3 to that represented in Fig. 4 until the valve 70 is entirely closed, the operation of these stop-segments or interlocking stops being well understood in the art.

Figure 7:
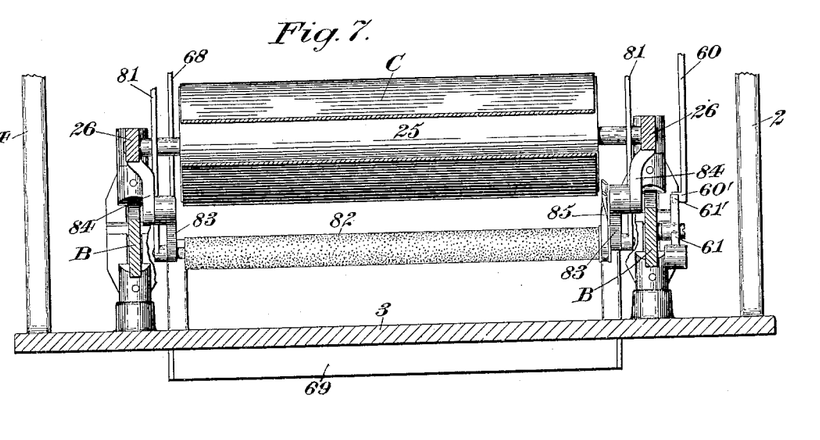

For the purpose of promptly checking the advancing movement of the feeding-conveyer F when the belt 31 is shifted from the fast pulley 34 to the loose pulley 33 I have shown at 77 a friction-band secured at one of its ends to the bracket 5''' (shown at the left in Fig. 1) and at its other end to an arm 78, secured to the valve-shaft 72, this band passing around a friction-wheel 79, secured to the end of the shaft 49' and serving, when the valve is closed, as a brake for instantaneously stopping the traveling movement of the conveyer-belt. The valve-shaft 72 may also carry another pair of rock-arms, such as 80, to which are pivoted connecting-rods 81, which extend inside the scale-beams to a point below the forward drum 25 and are connected at their lower ends to a scraper 82. This scraper is preferably in the form of a rotary brush journaled at its opposite ends in a pair of oscillatory arms 83, carried by hangers 84, depending from opposite sides of the frame 26. (See Fig. 7.)

It will be obvious that when the valve 70 is opened the brush will be lowered and that when this valve is closed the brush will be raised into engagement with the lower side of the conveyer C and will serve as a scraper for cleaning said conveyer and throwing loose particles of the load which may adhere to the belt into the receiving bin or chamber 75.

The scraper 82 will preferably be driven by means of a crossed belt 85, operated from a guide-roller 86, which is supported by the frame 26 at the under side thereof and on which the lower run of the conveyer C rests, this guide-roller, as will be obvious, being driven by said conveyer when the load is being discharged from the machine. The roller 86 will of course lie between the beam-arms of the scale-beams, so as to avoid interference therewith.

The operation of a weighing-machine constructed in accordance with my invention as herein set forth is as follows: With the parts in the positions shown in Fig. 3 it will be seen that the feeder F will carry material from the bin H up over the upper edge of the feeder and will deliver the same onto the upper run of the load-receiving and material-carrying conveyer C, which at this time is held against traveling movement, as the driving-belt 32 is carried on the loose pulley 35. (See Fig. 1.) As soon as the load is made up the frame 26 is carried down to the position shown in Fig. 4, and the stop 60' passes down below the stop 61', and thus permits the release of the drip-lever 60, whereupon the counterweighted lever 57, which during the descent of the frame 26 has been carried from the position shown in full lines in Fig. 4 to that illustrated in dotted lines in said figure, owing to the engagement of its inner end against the thrust-rod 58, which then constitutes a rigid abutment, is caused to oscillate and thereby actuate said thrust-rod, and with it the valve 70 for closing the latter, whereupon the stream will be cut off. The oscillation of the valve immediately operates to draw the friction-band 77 against the roller 79, thereby positively stopping the advancing movement of the feeder-belt. At the same time the connections from the shaft 72 cause the belt-shippers 42 and 45 to be automatically operated to simultaneously shift the belt 31 from the fast pulley 34 to the loose pulley 33 and the belt 32 from the loose pulley 35 to the fast pulley 36.

It will be noticed by reference to Fig. 1 that the loose pulley 35 is held down by the belt 32 in such a position that when the frame 26 is in its lowermost position, at the moment the full load is made up on the conveyer C, said loose pulley will be properly positioned for permitting the belt 32 to be shifted onto the pulley 36 in the manner just described, and also by reference to Fig. 2 it will be clear that as soon as said belt is shifted off from the loose pulley 35 the latter rises, and that on the ascent of the weighing-conveyer C to its uppermost position said loose pulley will be in position to receive the belt 32 from the fast pulley 36.

As soon as the automatic belt-shippers are operated in the manner just described it will be apparent that the advancing movement of the continuous apron forming the feeder F will be checked and that the endless belt forming the load-receiving weighing-conveyer C will immediately be operated by the rotation of the pulley 36 and the drum 25 to convey the load supported on the upper run of the weighing-conveyer off from the left-hand end of said run, as shown in Fig. 4, to discharge the material therefrom. At the moment of the closing of the valve 70 it will be apparent that the stop-segment 65 is oscillated to a position where it releases the segment 66 and permits the load, as it is delivered into the discharge-chamber 75, to oscillate the regulator 69 from the position shown in Fig. 3 to that represented in Fig. 4. Moreover, the brush or scraper 82 is simultaneously actuated by the connections from the valve and is automatically raised to bring the brush into engagement with the lower run of the conveyer C, whereupon the brush will be rotated from the roller 86, over which the endless load-receiving belt travels.

Although of course the conveyer C will rise to its uppermost position as soon as the first portion of the load has been discharged, said conveyer will continue to advance, owing to the fact that the material falling upon the regulator-plate 69 will maintain the latter in the position shown in Fig. 4, and therefore will hold the stop-segment 66 in position to block the opening movement of the valve 70; but as soon as the last part of the load has been delivered onto the regulator-plate 69 and discharged through the chamber 75 the regulator will oscillate to the position shown in Fig. 3 and withdraw the stop-segment 66 from engagement with the coöperative segment 65, whereupon the valve-opening actuator 90 will become effective to oscillate the valve to open the same. As soon as this is effected it will be evident that the rotary scraper or brush 82 will be dropped to the position shown in Fig. 3, and that the automatic belt-shippers will be operated to shift the belt 32 from the fast pulley 36 onto the loose pulley 35 and the belt 31 from the loose pulley 33 to the fast pulley 34, and that all of the parts of the machine will be brought into position for permitting the making up of a new load, as the advancing movement of the load-receiving conveyer C will be checked as soon as the driving-belt 32 is disconnected, and immediately thereafter the feeding-conveyer F will become effective to deliver a new load onto the conveyer C.

Having described my invention, I claim—

1. The combination, with stream-supplying means, of supporting means; weighing mechanism carried by said supporting means and embodying a fixedly-supported force-feed material-conveyer having an independent material-conveying movement relatively to its support; and means controlled by the weighing mechanism for actuating said conveyer.

2. The combination, with stream-supplying means, of supporting means; weighing mechanism carried by said supporting means and embodying a fixedly-supported force-feed material-supporting conveyer having an independent material-conveying movement relatively to its support; and means controlled by the weighing mechanism for actuating said conveyer.

3. The combination, with stream-supplying means, of supporting means; weighing mechanism carried by said supporting means and embodying a fixedly-supported traveling force-feed conveyer having an independent material-conveying movement relatively to its support; and means controlled by the weighing mechanism for actuating said conveyer.

4. The combination, with stream-supplying means, of supporting means; weighing mechanism carried by said supporting means and embodying a load-receiver consisting of a fixedly-supported conveyer having an independent material-conveying movement relatively to its support; and means controlled by the weighing mechanism for actuating said conveyer.

5. The combination, with stream-supplying means, of supporting means; weighing mechanism carried by said supporting means and embodying a load-receiver consisting of a fixedly-supported force-feed conveyer having an independent material-conveying movement relatively to its support; and means controlled by the weighing mechanism for actuating said conveyer.

6. The combination, with stream-supplying means, of supporting means; weighing mechanism carried by said supporting means and embodying a load-receiver consisting of a fixedly-supported endless conveyer having an independent material-conveying movement relatively to its support; and means controlled by the weighing mechanism for actuating said conveyer.

7. The combination, with stream-supplying means, of supporting means; weighing mechanism embodying fixedly-supported load-receiving force-feeding means operative alternately as a load-receiver and as a conveyer and having a material-conveying movement relatively to its support; and means controlled by the weighing mechanism for actuating said conveyer.

8. The combination, with stream-supplying means, of supporting means; weighing mechanism embodying a load-receiver, consisting of a fixedly-supported force-feed conveyer having an independent material-conveying movement relatively to its support; and means controlled by the weighing mechanism for intermittently actuating said conveyer.

9. The combination, with stream-supplying means, of supporting means; weighing mechanism carried by said supporting means and embodying a fixedly-supported load-receiving force-feeding conveyer having an independent material-conveying movement relatively to its support; and means controlled by the weighing mechanism for actuating said conveyer on the completion of a load.

10. The combination, with beam mechanism, of a force-feed material-conveyer fixedly supported thereon and having an independent material-conveying movement relatively to its support; and means controlled by the beam mechanism for actuating said conveyer.

11. The combination with beam mechanism, of a force-feed material-conveyer pivotally supported thereon and permanently carried thereby; and means controlled by a scale-beam for actuating said conveyer.

12. The combination with supporting means, of a pair of oppositely-disposed scale-beams pivotally mounted thereon; a force-feed material-conveyer pivotally supported by said beams; and means controlled by a scale-beam for actuating said conveyer.

13. The combination with supporting means, of a pair of oppositely-disposed scale-beams pivotally mounted thereon; a force-feed material-conveyer pivotally supported by said beams outside of the pivots of the beams; and means controlled by a scale-beam for actuating said conveyer.

14. The combination with supporting means, of a pair of oppositely-disposed scale-beams pivotally mounted thereon; a frame pivotally supported by said beams; parallel rotary carriers journaled in said frame; an endless material-carrying belt supported on said rotary carriers; and means controlled by a scale-beam for actuating said carrying-belt.

15. The combination with supporting means, of a pair of oppositely-disposed scale-beams pivotally mounted thereon; a frame pivotally supported by said beams; parallel rotary carriers journaled in said frame and disposed transversely to the scale-beams; an endless material-carrying belt supported on said rotary carriers; and means controlled by a scale-beam for actuating said carrying-belt.

16. In a weighing mechanism, the combination with a material-carrying force-feed weighing-conveyer permanently carried by the scale-beam; of a rotary carrier for actuating said conveyer; continuously-operative driving means; and means controlled by the weighing mechanism for coupling and uncoupling said rotary carrier and said driving means.

17. In a weighing mechanism, the combination with an endless load-receiving force-feed weighing-conveyer; of a rotary carrier for actuating said conveyer; continuously-operative driving means; and means for coupling and uncoupling said rotary carrier and said driving means.

18. In a weighing-machine, the combination with a material-feeding conveyer and with a load-receiving force-feed weighing-conveyer; of rotary carriers for actuating said conveyers; continuously-operative driving means; and means for coupling said respective carriers to, and uncoupling them from, said driving means.

19. In a weighing-machine, the combination with an endless material-feeding conveyer and with an endless load-receiving force-feed weighing-conveyer; of rotary carriers for actuating said conveyers; continuously-operative driving means; and means for coupling said respective carriers to, and uncoupling them from, said driving means.

20. In a weighing-machine, the combination of a pair of alternately-operative conveyers, one of which constitutes a material-feeding conveyer, and the other of which constitutes a material-receiving conveyer and is movable with the weighing mechanism of said machine.

21. In a weighing-machine, the combination of a pair of alternately-effective material-advancing conveyers, one of which constitutes a load-receiving conveyer and is movable with the weighing mechanism of said machine.

22. In a weighing-machine, the combination of a pair of reciprocally-effective material-advancing conveyers, one of which constitutes a feeding-conveyer, and the other of which constitutes a load-receiving weighing-conveyer and is movable with the weighing mechanism of said machine.

23. The combination with weighing mechanism embodying a rotary carrier permanently mounted thereon and movable therewith; of driving means independent of said weighing mechanism; and automatically-operative coupling and uncoupling means controlled by the weighing mechanism between said rotary carrier and said driving means.

24. The combination with weighing mechanism embodying a material-conveyer permanently supported thereon and movable therewith; and a rotary carrier mounted on said weighing mechanism, for actuating said conveyer; of driving means independent of said weighing mechanism; and automatically-operative coupling and uncoupling means controlled by the weighing mechanism between said rotary carrier and said driving means.

25. The combination with weighing mechanism embodying a fast pulley mounted thereon and movable therewith; of a loose pulley independent of said weighing mechanism; a driving-belt; and automatic belt-shipping means for shifting said belt from the loose pulley to the fast pulley, and vice versa.

26. The combination with weighing mechanism embodying a fast pulley mounted thereon and movable therewith; of a vertically-movable loose pulley independent of said weighing mechanism; a driving-belt; and automatic belt-shipping means for shifting said belt from the loose pulley to the fast pulley when the loose pulley is in its lowermost position, and from the fast pulley to the loose pulley when the latter is in its uppermost position.

27. The combination with weighing mechanism embodying a fast pulley mounted thereon and movable therewith; of a vertically-movable reactive loose pulley independent of said weighing mechanism; a driving-belt; and automatic belt-shipping means for shifting said belt from the loose pulley to the fast pulley when the loose pulley is in its lowermost position, and from the fast pulley to the loose pulley when the latter is in its uppermost position.

28. The combination with weighing mechanism embodying a fast pulley mounted thereon and movable therewith; of a vertically-movable spring-pressed loose pulley independent of said weighing mechanism; a driving-belt normally holding said loose pulley in its lowermost position against the force of the spring; and automatic belt-shipping means for shifting said belt from the loose pulley to the fast pulley when the loose pulley is in its lowermost position, and from the fast pulley to the loose pulley when the latter is in its uppermost position.

29. In a weighing mechanism, the combination with an endless material-carrying weighing-conveyer having alternate weighing and conveying movements; of a scraper; and automatically-operative scraper-shifting means for alternately throwing the scraper into and out of engagement with the conveyer.

30. The combination with an endless conveyer, of a cut-off valve embodying a plurality of transversely-separated fingers independently movable relatively to each other in the direction of its working stroke.

31. The combination with a valve composed of a series of transversely-separated members, of a shaft on which said members are loosely mounted; means for closing the valve; and means, including a cross-bar, carried by the shaft for opening said valve.

32. The combination with a shaft, of a series of transversely-separated fingers, each comprising a rigid portion and a flexible portion mounted thereon; arms projecting from the shaft; a cross-bar carried by said arms; and means connected with said shaft for opening and closing the valve.

33. The combination with a valve and its supporting-shaft, of a conveyer; means for actuating the conveyer; and a brake operated by the valve-shaft, for stopping the motion of said conveyer.

34. The combination with stream-supplying means, of a valve embodying a plurality of transversely-separated fingers independently movable relatively to each other in the direction of its working stroke.

FRANCIS H. RICHARDS.

Witnesses:
FRED. J. DOLE,
HEATH SUTHERLAND.